L. N. CRICHTON.
ELECTRICAL DEVICE.
APPLICATION FILED APR. 5, 1916.

1,308,048.

Patented July 1, 1919.

WITNESSES:
Fred. A. Lind.
J. A. Procter

INVENTOR
Leslie N. Crichton
BY
Wesley G. Carr
ATTORNEY

UNITED STATES PATENT OFFICE.

LESLIE N. CRICHTON, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRICAL DEVICE.

1,308,048.  Specification of Letters Patent.  Patented July 1, 1919.

Application filed April 5, 1916.  Serial No. 89,173.

*To all whom it may concern:*

Be it known that I, LESLIE N. CRICHTON, a citizen of the United States, and a resident of Wilkinsburg, in the county of Allegheny and State of Pennsylvania, have invented a new and useful Improvement in Electrical Devices, of which the following is a specification.

My invention relates to electrical devices and particularly to means for determining the mathematical ratio of two forces.

One object of my invention is to provide a device of the above indicated character that shall have means for protecting an electrical translating device in accordance with its temperature.

Another object of my invention is to provide a device of the above indicated character that shall be adapted to indicate phase-angular relations in electric circuits and shall not be rendered inaccurate in its operation by reason of a change in the voltage or the current of the circuit.

When two electro-responsive devices are disposed at substantially right angles with respect to each other and supplied with energy in accordance with predetermined conditions, if these conditions change, a movable member that is connected between the devices may be adapted to be actuated in accordance with the ratio of the predetermined conditions, and whenever they are subjected to similar changes, the movable member will remain stationary. A device of this type is particularly adaptable to protect an electrical translating device in accordance with its temperature and is not affected by changes in voltage. My device may also be used as a phase-meter and for other similar purposes, when properly connected.

Figure 1:
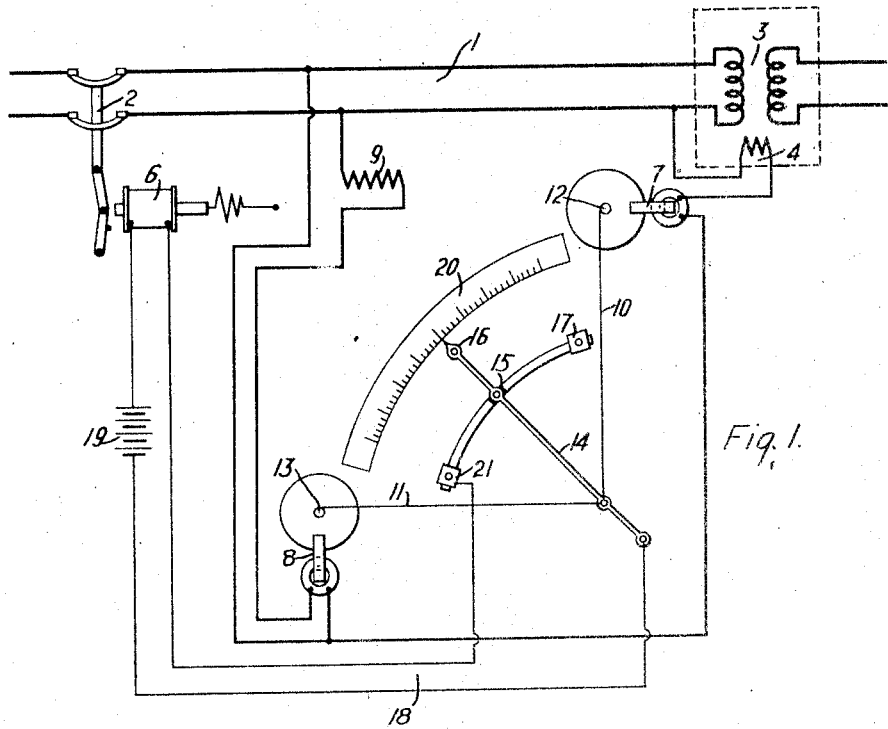
Figure 2:
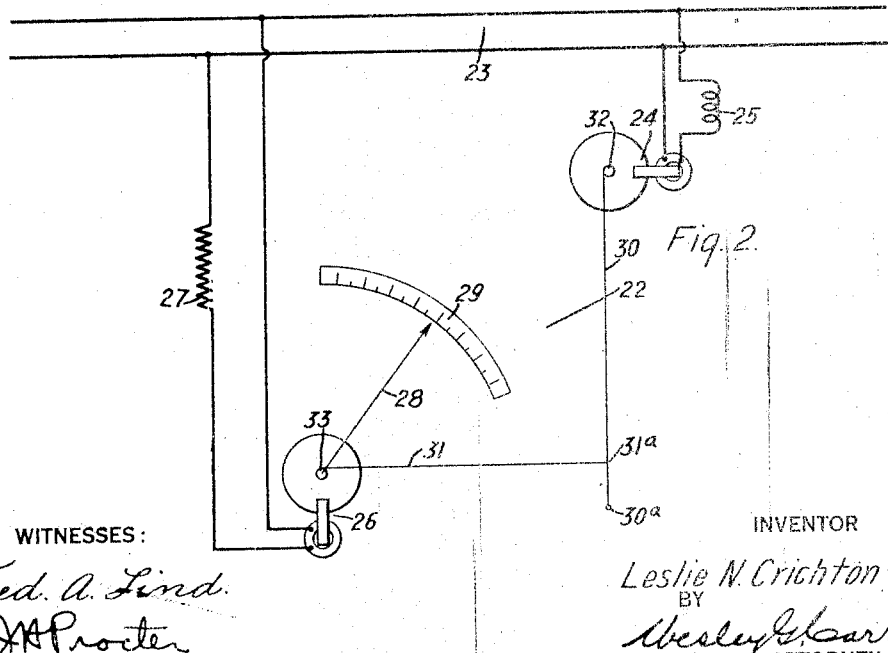

Figure 1 of the accompanying drawing is a diagrammatic view of an electrical translating device that is adapted to be protected by a device embodying my invention, and Fig. 2 is a diagrammatic view of a phase-meter embodying my invention.

In Fig. 1 of the drawing, an electrical circuit 1 is provided with a circuit interrupter 2 and with a transformer 3 or other similar translating device. An exploring coil or resistor 4 is disposed in such position with respect to the transformer 3 that it may be heated in accordance with the temperature of the transformer. The circuit interrupter 2 is provided with a trip coil 6 that is adapted to trip the circuit interrupter when the temperature of the transformer 3 and, consequently, the resistor 4, reach a predetermined value.

An electro-responsive device 7, such as a voltmeter, is connected in circuit with the resistor 4, and the circuit, thus constituted, is connected across the conductors of the circuit 1. A second electro-responsive device or voltmeter 8 is connected in circuit with a resistor 9 having a negligible temperature co-efficient, and the circuit, thus constituted, is also connected across the conductors of the circuit 1. The electro-responsive devices 7 and 8 are disposed substantially at right angles with respect to each other and are provided with flexible members or cords 10 and 11 that are adapted to be wound upon their shafts 12 and 13, respectively. The free ends of the flexible members or cords 10 and 11 are connected to a pivoted member 14 that is provided with a contact member 15 and a pointer 16. The contact member 15 is adapted to engage a stationary contact member 21 for the purpose of effecting the closure of the trip-coil circuit 18 that comprises the trip coil 6 and a source 19 of electromotive force. The pointer 16 is adapted to coöperate with a scale 20 for the purpose of indicating the rise in temperature of the transformer 3, and the contact member 21 is adapted to be set in any predetermined position with respect to the scale 20 in order that the trip coil 6 may be energized under any predetermined condition.

Under normal conditions of operation of the transformer 3, the currents traversing the electro-responsive devices 7 and 8 may be assumed to be substantially equal, and, consequently, the movable member 14 will remain stationary. If the load on the transformer 3 decreases, its temperature will decrease to cause the temperature and, consequently, the resistance of the exploring coil or resistor 4 to decrease. When this condition obtains, relatively more current will traverse the exploring coil 4 and the electro-responsive device 7 to cause the torque of the latter to increase sufficiently to move the member 14 toward a stationary member 17. However, if an overload occurs on the transformer 3, it will increase in temperature, and, consequently, the resistance of the resistor 4 will so change that less current will traverse the electro-responsive device 7 than traverses the electro-responsive device 8, and the movable member 14 will move in a counter-clockwise direction to effect the tripping of the circuit interrupter 2. Since the movable member 14 is actuated in accordance with the ratio of the forces of the devices 7 and 8, when the voltage of the circuit 1 changes, the movable member 14 will remain stationary. Thus, my device is free from errors due to changes in its operating voltage.

In Fig. 2 of the drawing, a frequency meter 22, is operatively connected to an electrical circuit 23. The meter 22 comprises an electro-responsive device 24 that is operatively connected, through a reactor 25, to the circuit 23, and electro-responsive device 26 that is operatively connected through a resistor 27 to the circuit 23, a movable pointer 28 for the electro-responsive device 26 and a scale 29. Flexible members or cord 30 and 31 are adapted to be wound from one of their ends upon the shafts 32 and 33 of the electro-responsive devices 24 and 26, respectively. The other end of the cord 30 is connected to a stationary member 30ª, and the other end of the cord 31 is connected to an intermediate point 31ª on the cord 30. Thus, the pointer 28 will indicate, in connection with the scale 29, the ratio of the currents traversing the electro-responsive devices 24 and 26. While I have illustrated a modified scheme of operatively connecting the electro-responsive devices, it will be understood that they may also be connected substantially as shown in Fig. 1 of the drawing.

If the reactor 25 and the resistor 27 are so proportioned that, at a predetermined frequency, the same value of current traverses the electro-responsive devices 24 and 26, the pointer 28 will remain in its initial position. However, if the frequency changes, more current will traverse one electro-responsive device than will traverse the other, and the pointer 28 will be permitted to move a distance to indicate the frequency of the circuit 23.

I do not wish to be limited to the specific applications of my invention illustrated nor to the means for connecting the electro-responsive devices, as many modifications and adaptations may be made therein without departing from the spirit and scope of the invention as set forth in the appended claims.

I claim as my invention:

1. In an electric circuit, the combination with a translating device, of means operatively connected to the circuit that is responsive to the temperature of the translating device, a resistor having substantially zero temperature coefficient, a second responsive means connected in series with the resistor to the circuit, and means actuated in accordance with the differential forces of the responsive means.

2. In an electric circuit, the combination with a translating device, of means operatively connected to the circuit that is responsive to changes in the temperature of the translating device, resistor having substantially zero temperature co-efficient, a second responsive means operatively connected in series with the resistor to the circuit, and a protective device adapted to be actuated in accordance with the ratio of the forces of the said responsive means.

3. In an electric circuit, the combination with a translating device, of means responsive to the temperature of the translating device, a resistor having a neglible temperature co-efficient, a second responsive means connected in series with the resistor to the circuit, and means adapted to be actuated in accordance with the ratio of the forces of the aforesaid responsive means.

4. In an electric circuit, the combination with a translating device, a resistor adapted to be heated in accordance with the temperature of the translating device, and a second resistor having substantially zero temperature co-efficient, of an electro-responsive device connected in circuit with the first resistor, a second electro-responsive device connected in circuit with the second resistor, and means adapted to be actuated in accordance with the ratio of the torques of the electro-responsive devices.

5. In an electric circuit, the combination with a translating device, an exploring resistor adapted to be heated in accordance with the temperature of the translating device, and a second resistor, of an electro-responsive device connected to the exploring resistor and to the electric circuit, a second electro-responsive device connected to the second resistor and to the electric circuit, and a movable member, said electro-responsive devices being so connected together that the movable member is adapted to move in accordance with the ratio of the torques of the electro-responsive devices.

In testimony whereof, I have hereunto subscribed my name this 31st day of March 1916.

LESLIE N. CRICHTON.